(12) United States Patent
Andonian et al.

(10) Patent No.: US 7,764,324 B2
(45) Date of Patent: Jul. 27, 2010

(54) TERAHERTZ CAMERA

(75) Inventors: Gerald Andonian, Toluca Lake, CA (US); Salime M. Boucher, Los Angeles, CA (US); Pedro E. Frigola, Culver City, CA (US); Alex Y. Murokh, Sherman Oaks, CA (US); Timur Shaftan, Middle Island, NY (US); Gil Travish, Santa Monica, CA (US)

(73) Assignee: Radiabeam Technologies, LLC, Los Angeles, CA (US)

( * ) Notice: Subject to any disclaimer, the term of this patent is extended or adjusted under 35 U.S.C. 154(b) by 849 days.

(21) Appl. No.: 11/669,109

(22) Filed: Jan. 30, 2007

(65) Prior Publication Data

US 2008/0179519 A1 Jul. 31, 2008

(51) Int. Cl.
*G02F 1/133* (2006.01)
(52) U.S. Cl. ..................................... 349/20; 348/E5.09
(58) Field of Classification Search .................. None
See application file for complete search history.

(56) References Cited

U.S. PATENT DOCUMENTS

| | | | |
|---|---|---|---|
| 3,569,709 A | 3/1971 | Wank | |
| 3,600,060 A | 8/1971 | Kettering et al. | |
| 3,730,985 A | 5/1973 | Whitney | |
| 3,770,961 A | 11/1973 | Westell | |
| 3,866,045 A | 2/1975 | Ely et al. | |
| 3,957,349 A | 5/1976 | Nelson | |
| 3,999,838 A | 12/1976 | Sprokel | |
| 4,051,370 A | 9/1977 | Bly | |
| 4,099,857 A | 7/1978 | Hareng et al. | |
| 4,147,932 A | 4/1979 | Lewis | |
| 4,334,735 A | 6/1982 | Hareng et al. | |
| 4,427,888 A | 1/1984 | Galvin | |
| 4,751,387 A | 6/1988 | Robillard | |
| 4,792,213 A | 12/1988 | Hilsum | |
| 4,917,476 A | 4/1990 | Makh et al. | |
| 4,949,174 A * | 8/1990 | Wiltshire | 348/164 |
| 4,960,901 A * | 10/1990 | Borror et al. | 548/207 |
| 5,144,149 A * | 9/1992 | Frosch | 250/493.1 |
| 5,192,645 A * | 3/1993 | Boggs et al. | 430/338 |
| 5,309,230 A | 5/1994 | Blondel et al. | |

(Continued)

OTHER PUBLICATIONS

J P Lesieur et al., "Gain and visualization of the modes of a thermally stabilized HCN laser," Phys.d: Appl. Phys., 1972, p. 1212-1218, vol. 5, Great Britain.

(Continued)

*Primary Examiner*—Timothy Rude
(74) *Attorney, Agent, or Firm*—Filwider Patton LLP

(57) ABSTRACT

A thermal imaging device is provided for converting an image in the terahertz radiation range to the visible range. In one embodiment, the device includes a converter having a thermochromic liquid crystal layer mounted on a sapphire base. In another embodiment, the device includes a thermal absorption layer including a metal selected from the group of iron, aluminum, tin, and copper. In a further embodiment, the device has an light source shaped as an annulus for illuminating a rearward surface of the converter, configured to permit visible light rays to pass through the annulus for capture by a digital detector. In a final embodiment, the device has a thermal adjustment device for adjusting the temperature of the thermochromic liquid crystal layer to an optimal temperature.

15 Claims, 1 Drawing Sheet

U.S. PATENT DOCUMENTS

| | | | |
|---|---|---|---|
| 5,420,419 A | 5/1995 | Wood | |
| 5,701,015 A | 12/1997 | Lungershausen et al. | |
| 5,900,799 A * | 5/1999 | Morris | 338/18 |
| 5,994,699 A | 11/1999 | Akagawa | |
| 6,016,383 A | 1/2000 | Gronet et al. | |
| 6,133,569 A | 10/2000 | Shoda et al. | |
| 6,292,212 B1 | 9/2001 | Zigadlo et al. | |
| 6,353,223 B1 | 3/2002 | Ookawa | |
| 6,420,704 B1 | 7/2002 | Berenz et al. | |
| 6,434,327 B1 | 8/2002 | Gronet et al. | |
| 6,504,155 B1 | 1/2003 | Ookawa | |
| 6,591,021 B1 | 7/2003 | Breiter et al. | |
| 6,707,044 B2 | 3/2004 | Lannestedt et al. | |
| 6,759,949 B2 | 7/2004 | Miyahara | |
| 6,894,280 B2 | 5/2005 | Ookawa | |
| 7,034,300 B2 | 4/2006 | Hamrelius et al. | |
| 7,432,506 B2 * | 10/2008 | Roman et al. | 250/332 |
| 7,502,605 B2 * | 3/2009 | Castiglione et al. | 455/313 |
| 7,652,765 B1 * | 1/2010 | Geshwind et al. | 356/330 |
| 2006/0232674 A1 * | 10/2006 | Cochran | 348/164 |
| 2006/0274812 A1 * | 12/2006 | Safai et al. | 374/5 |
| 2007/0023661 A1 * | 2/2007 | Wagner et al. | 250/338.1 |

OTHER PUBLICATIONS

Giordano Papi et al., "Microwave Holographic Interferometry", IEEE Transaction on Antennas and Propagation, Nov. 1971, p. 740-746, vol. AP-19 No. 6.

G. Tricoles et al., "Microwave Holography: Applications and Techniques," Proceedings of the IEEE, Jan. 1, 1977, p. 108-130, vol. 65, No. 1.

Franco Giannini et al., "Liquid crystal improved technique for thermal field measurements," Applied Optics, Sep. 1, 1979, p. 3048-3052, vol. 18, No. 17.

M.D. Fox, Letters to the Editor, Applied Optics, vol. 14, No. 7, Jul. 1975, pp. 1476-1492.

* cited by examiner

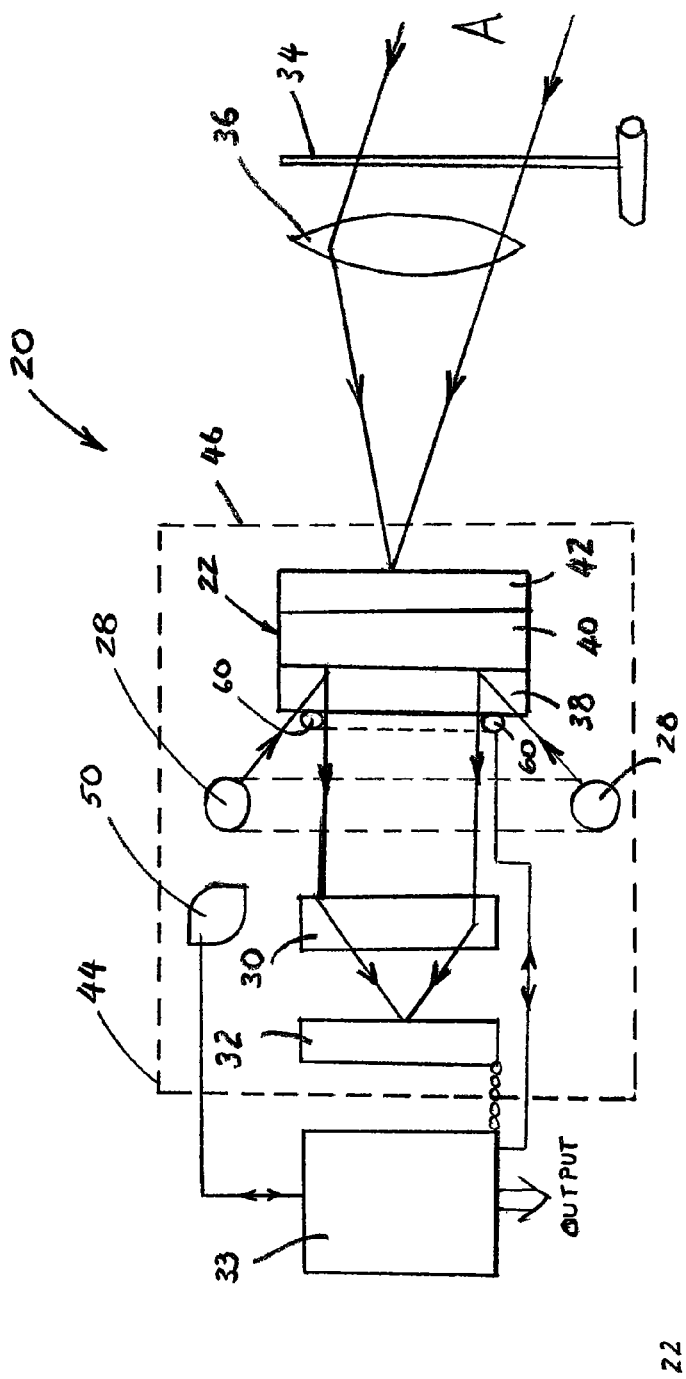
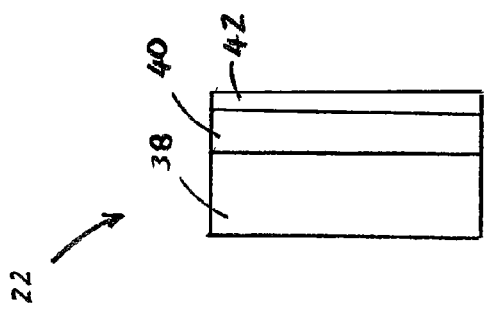
Fig. 1
Fig. 2

TERAHERTZ CAMERA

BACKGROUND OF THE INVENTION

The present invention relates to radiometry and, more particularly, to a terahertz radiation liquid crystal imaging system.

Over the past 30 years, thermochromic liquid crystal (TLC)-based thermography systems have provided engineers with a relatively inexpensive technique for investigating thermal phenomena in the electronics, automotive, and aerospace industries, as well as in academia.

Conventional TLC thermal imaging devices include an infra-red sensitive detector and one or more infra-red optical components which focus the radiation from a thermal scene on to the surface of the detector, which operates to convert the infra-red radiation into visible radiation. The material of the detector (converter) is chosen to have a highly temperature-dependent optical property, such as birefringence or optical rotation. This detector is also illuminated by a visible or near-visible polarized light source the output of which is reflected onto the detector. The visible or near-visible light experiences a modulation of polarization, on passing through the detector, which is converted to an intensity modulation by a quarter-wave plate and an analyzer. This intensity modulation conferred on the light passing through the detector thus corresponds to temperature variations induced in the detector by the infra-red radiation. In conventional devices, the modulated light is then focused by lenses through a Fourier plane filter on to a television camera chip the output of which is read into a frame store.

In order to vary the field of view of the device, an infra-red zoom lens is used to focus the radiation from the thermal scene on to the liquid crystal. Infra-red lenses are expensive, and infra-red zoom lenses particularly so; so for any individual system, the range of lenses is usually limited.

However, shortcomings still remain. The lack of sensitivity of the detector to non-visible radiation is still a problem that confronts the art. Accordingly, there is a need in the art for a method and device that will improve sensitivity of thermal imaging devices.

SUMMARY OF THE INVENTION

Central to this invention is the use of a thermo-chromic liquid crystal (TLC) layer. It is known in the art that a liquid crystal is a thermodynamic phase between the pure solid and pure liquid phases of matter, that exists in some organic compounds under certain conditions. At temperatures below the "event temperature," a TLC is a transparent solid. After its event temperature, the TLC material will reflect visible light of a unique wavelength (i.e. color). As the temperature rises through the TLC bandwidth, the reflected color of the TLC will change. Beyond its "clearing point temperature," the material is a transparent liquid. This selective reflection occurs in most TLCs both on heating and cooling, with minimal hysteresis. The difference between the clearing point temperature and the event temperature is known as the thermal bandwidth. The point halfway between the event temperature and the clearing temperature is known as the central temperature.

The reflected color distribution for most TLC materials varies continuously from the longer wavelengths (red) at the event temperature to shorter wavelengths (blue) at the clearing point temperature. Because a TLC material also transmits a significant amount of the incident light with virtually no modification, TLCs may be viewed against a nonreflecting (black) background to prevent this unimportant light from adversely affecting the interpretation of the selectively reflected light. The color-temperature response may be captured with a color camera and a color-versus-temperature calibration curve may be used to create a very effective TLC-based thermography system.

With reference to the drawings, which are provided for exemplification and not limitation, there is described a thermal imaging device comprising an image converter configured to receive incoming terahertz radiation on a forward face and to convert the incoming radiation to visible radiation. The converter includes a rigid base component made of a sapphire crystal, a thermochromic liquid crystal layer applied to a forward face of the rigid base, and a thermal absorption layer applied to the forward face of the liquid crystal. A visible light source may be configured to illuminate the rearward face of the converter. A detector adapted to detect visible light emitting from a rearward face of the converter is provided. The detector can capture a visible image formed on a rearward face of the thermochromic liquid crystal layer. In a preferred aspect of the invention, the sapphire crystal has an aspect ratio of between 7 and 8.5, and has a thickness of between 3 mm and 5 mm.

In another embodiment of the invention, the rigid base may simply be a material transparent to visible light. In this embodiment, the thermal absorption layer includes a metal. In one aspect, the metal may be in a powdered form, preferably mixed with a water soluble paint to facilitate application. In another aspect, the thermal absorption layer includes a metal in the form of a thin film. The metal of these aspects is selected from the group of iron, aluminum, tin, and copper. Where a thin film is used, the thickness of the thin film is such that the resistance of the film is within 5% of the impedance of free space.

In a further embodiment of the invention, the thermal imaging device has a visible light source configured to illuminate the rearward face of the converter, in which the light source has the shape of an annulus with an opening. In one aspect of this embodiment, the light source is positioned such that the visible light emitting from the rearward face of the converter may pass through the opening of the light source to reach the detector for capture as a visible image.

In a final embodiment of the invention, a method for adjusting the temperature of a thermochromic liquid crystal layer used for converting a thermal image into a visible image is described. The method includes transmitting infrared radiation onto the thermochromic liquid crystal layer such that a visible image appears on the layer. Then, the step of capturing the visible image on a digital camera, feeding the image to a computer, and, by using the computer, translating the image into a two dimensional map of the temperature of the thermochromic liquid crystal. The computer analyzes the image and determining whether the image is saturated, lowering the temperature of the thermochromic liquid crystal layer if the image is saturated; and otherwise maintaining the temperature of the thermochromic liquid crystal layer at a central temperature if the image is not saturated. In this way, the thermochromic liquid crystal may be held to an optimal temperature for color sensitivity.

These and other advantages of the invention will become more apparent from the following detailed description thereof and the accompanying exemplary drawings.

BRIEF DESCRIPTION OF THE DRAWINGS

FIG. 1 is a schematic view of a thermal imaging device incorporating features of the present invention.

FIG. 2 is an elevational section through an image converter of the present invention.

DETAILED DESCRIPTION OF THE PREFERRED EMBODIMENTS

With reference to the figures, a preferred embodiment of the invention includes a thermal imaging device 20 for detecting the presence of electromagnetic waves in the terahertz frequency range, and converting such waves to a storable image in the visible frequency range.

Referring first to FIG. 1, the device 20 includes a converter 22 having a forward face and a rearward face. The terms "forward" and "rearward" are defined in relation to the orientation of the thermal imaging device, with forward being the direction of the object to be imaged. A means for forming a focused image of a thermal scene on to the forward face of the converter 22 may be provided, but is not a requirement of the invention. In an alternative embodiment, there may be provided an aperture (not shown) of suitable dimension to focus the electromagnetic waves by the well known pinhole effect. The aperture may be sealed by a transparent material having no optical properties. Focusing the incoming electromagnetic waves on the converter 22 is not a requirement of the invention, which may also be used in connection with unfocused waves incident upon the converter.

A visible light source 28 may be arranged off-axis to illuminate the rearward face of the converter 22, and a visible light lens 30 may be interposed between the converter 22 and a camera chip 32 which may be a still or moving image sensor chip, such as a charge-coupled device (CCD) or complementary metal-oxide-semiconductor (CMOS) image sensor chip. The chip may be configured within a conventional digital camera, whether still or moving, and is connected to a computerized frame store 33. The term 'visible light' as used herein is intended to include light in the near infra-red and near ultra-violet parts of the spectrum which can be transmitted without significant attenuation by conventional optical lenses which are substantially transparent to light which is visible to the human eye. In a preferred embodiment, the visible light is described as 'white', meaning that it has a flat power spectrum from violet to red, with all colors present in similar power levels.

The means for forming a focused image of the thermal scene A (FIG. 1) may include a chopper or fast shutter 34 which chops the infra-red radiation incident on an infra-red lens 36. This lens directs the radiation on to a forward surface of the converter 22.

Turning now to a detailed description of the converter 22, as best seen in FIG. 2., the converter is configured as laminations of various materials. A rigid foundation of the converter is a base 38 having good thermal conduction properties and is transparent to visible light. In a preferred embodiment, the base 38 is formed from a sapphire crystal which has been found to have advantageous transmission and conduction properties. Optimally, the sapphire crystal is dimensioned to be between 3-5 mm thick, and 20-30 mm by 20-30 mm high on the forward and rearward facing surfaces, or 20-30 mm in diameter if circular. A preferred aspect ratio (height to thickness ratio) is between 5 and 10, most preferably 7 to 8.5.

Upon a forward surface of the base 38 is affixed a layer 40 of thermo-chromic liquid crystal. The TLC is applied in a thin layer of a consistent thickness using conventional methods known in the art, such as spraying, Preferably, the liquid crystal layer has a thermal bandwidth less than 1 C, allowing the detector to have greater sensitivity. Also, the thickness of the TLC layer is preferably between 50 and 250 μm.

Finally, upon the forward surface of the liquid crystal layer 40 is applied an absorption layer 42 designed to have advantageous absorption properties for electromagnetic radiation from the extremely high frequency microwaves to the visible (frequencies of 50 GHz to 750 THz), with particular importance in the terahertz frequency range (300 GHz to 3 THz). In a first preferred embodiment of the present invention, the absorption layer 42 includes particles of metal in a powdered form, the metal being either iron, aluminum, tin, or copper. The powder may be mixed with a water based paint to provide a mixture suitable for application to the liquid crystal layer 40. In a second preferred embodiment, the thermal absorption layer 42 is a thin film (<1 μm thick) of a resistive metal (chosen from iron, aluminum, tin, or copper) which may be vapor deposited on the layer of TLC. The thickness of the thin film is ideally chosen such that the resistance of the film matches the impedance of free space (377 ohms), preferably within 5% of such impedance.

In a preferred embodiment, the converter 22 and the chip 32 are contained within a temperature-controlled enclosure 44, at least one wall 46 of which is designed to be transparent to terahertz radiation emitted from a field of view to be imaged. The temperature controlled enclosure 44 preferably contains the converter 22, the light source 28, and at least a portion of the chip 32, so that the converter 22 is fully contained within a temperature controlled environment.

Within the enclosure 44, a heat exchanger 60 (such as a Peltier cooler) may be coupled to the converter 22. In one embodiment, the heat exchanger 60 is a thermoelectric element having a copper section and a bismuth section joined at a junction. When current flows from copper section to bismuth section a temperature rise is produced; conversely, a temperature drop is produced when current flows from bismuth section to copper section.

Moreover, a thermal control system 50 may be provided for maintaining the TLC layer 40 at an optimal temperature within the enclosure 44. Cholesteric liquid crystal exhibits a characteristic color as a function of its absolute temperature. Thus, by maintaining the cholesteric liquid crystal at the temperature of maximum sensitivity, a highly contrasted visible representation of the energy received by the liquid crystal film from the terahertz frequency radiation may be presented.

The thermal control system 50 of the present invention preferably operates as follows. As a primary matter, the control system 50 raises or lowers the ambient temperature in the enclosure 44 to the "central temperature" of the TLC. When the control system has achieved this condition, the TLC is imaged with the digital camera 32 having high color resolution. The image is output to computerized frame store 33, which translates the image into a two-dimensional map of the temperature of the TLC layer 40. The control system also monitors and controls the temperature of the heat exchanger 60 using a feedback algorithm. In order to maintain the TLC layer 40 at an optimal sensitivity, the thermal control system is adjusted by the computerized frame store to keep the TLC at an optimal temperature, regardless of the ambient temperature of the enclosure. Thus, the computerized frame store 33 analyzes the image on the TLC and determines whether it is saturated by the incident radiation. If the image is saturated, the control system will lower the temperature of the converter 22 with its TLC layer 40, using the heat exchanger 60, and overrides the temperature setting in the enclosure at central temperature. If the image is not saturated, the control system will maintain the ambient temperature of the enclosure at a central temperature. Thus, it will be appreciated, the thermal control system has two feedback systems: First, by feedback it sets the ambient temperature of the enclosure 44 at the TLC central temperature. Second, it monitors the saturation level of the image on the TLC, and when the image becomes saturated, it lowers the converter 22 temperature using the heat exchanger 60. Thus, the second feedback system operates in the nature of a fine-tuning system for adjusting the temperature of the converter 22 to its optimal temperature.

The TLC material has a characteristic referred to as the 'relaxation time', which is the time that it takes for the liquid crystal to return to its previous state after being excited with radiation. This relaxation time is dependent on the thermal characteristics of the system. A TLC deposited on a larger or higher thermal-conductivity base material 42 will have a shorter relaxation time than otherwise. Also, the relaxation time is increased for larger amounts of radiation deposited on the TLC. Therefore, in order to minimize the relaxation time, it is advantageous to limit excessive radiation deposition on the TLC. This is accomplished with a fast shutter or chopper 34. The computer program will also adjust the shutter or chopper speed based on analysis of the image, to prevent excessive heating of the TLC and to minimize the relaxation time.

Thus, in use, the device of the present invention may be used as follows. Electromagnetic radiation in the terahertz range is emitted from a source A (FIG. 1). The source A may be the body of a person, a container, a landscape with multiple objects, or the like. The electromagnetic radiation may be focused by the lens 36 onto the forward surface of the converter 22 and thus directly onto the thermal absorption layer 42 covering the TLC 40. The thermal absorption layer absorbs the radiant energy in the electromagnetic radiation, and converts such energy into heat energy. The heat energy in the absorption layer is transmitted by conduction into the TLC layer 40, thereby causing the TLC to change color in the visible spectrum according to its inherent characteristic. Light from the TLC in the visible range passes through the sapphire base 38. The visible light lens 30 subsequently focuses the visible light from the converter 22 on to a pixilated camera chip 32, the output of which is fed into the computerized frame store 33. The successive light and dark frames formed in this way may be subtracted from each other to provide a video output.

These and other advantages of the invention will become more apparent from the following detailed description thereof and the accompanying exemplary drawings

We claim:
1. A thermal imaging device, comprising:
an image converter configured to receive incoming terahertz radiation on a forward face and to convert the incoming radiation to visible radiation, wherein the converter includes:
a rigid base component made of a sapphire crystal;
a thermochromic liquid crystal layer applied to a forward face of the rigid base;
a thermal absorption layer applied to the forward face of the liquid crystal;
a visible light source configured to illuminate the rearward face of the converter;
a detector adapted to detect visible light emitting from a rearward face of the converter, whereby the detector can capture a visible image formed on a rearward face of the thermochromic liquid crystal layer.

2. The thermal imaging device of claim 1, wherein the sapphire crystal has an aspect ratio of between 7 and 8.5.

3. The thermal imaging device of claim 1, wherein the sapphire crystal has a thickness of between 3 mm and 5 mm.

4. A thermal imaging device, comprising:
an image converter configured to receive incoming terahertz radiation on a forward face and to convert the incoming radiation to visible radiation, wherein the converter includes:
a rigid base component transparent to visible light
a thermochromic liquid crystal layer applied to a forward face of the rigid base;
a thermal absorption layer applied to the forward face of the liquid crystal,
wherein the thermal absorption layer includes a metal,
a visible light source configured to illuminate the rearward face of the converter;
a detector adapted to detect visible light emitting from a rearward face of the converter, whereby the detector can capture a visible image formed on a rearward face of the thermochromic liquid crystal layer.

5. The thermal imaging device of claim 4, wherein the metal in the thermal absorption layer is in a powdered form.

6. The thermal imaging device of claim 5, wherein the metal includes a metal selected from the group of iron, aluminum, tin, and copper.

7. The thermal imaging device of claim 4, wherein the metal is in the form of a thin film.

8. The thermal imaging device of claim 7, wherein the metal includes a metal selected from the group of iron, aluminum, tin, and copper.

9. The thermal imaging device of claim 8, wherein the thickness of the thin film is such that the resistance of the film is within 5% of the impedance of free space.

10. A thermal imaging device, comprising:
an image converter configured to receive incoming terahertz radiation on a forward face and to convert the incoming radiation to visible radiation, wherein the converter includes:
a rigid base component transparent to visible light,
a thermochromic liquid crystal layer applied to a forward face of the rigid base;
a thermal absorption layer applied to the forward face of the liquid crystal;
a visible light source configured to illuminate the rearward face of the converter, wherein the light source has the shape of an annulus with an opening;
a detector adapted to detect visible light emitting from a rearward face of the converter, whereby the detector can capture a visible image formed on a rearward face of the thermochromic liquid crystal layer.

11. The thermal imaging device of claim 10, wherein the light source is positioned such that the visible light emitting from the rearward face of the converter may pass through the opening of the light source to reach the detector for capture as a visible image.

12. The thermal imaging device of claim 10, wherein the light source is a light emitting diode.

13. A method for adjusting the temperature of a thermochromic liquid crystal layer used for converting a thermal image into a visible image, comprising:
transmitting infrared radiation onto the thermochromic liquid crystal layer such that a visible image appears on the layer;
capturing the visible image on a digital camera;
feeding the image to a computer;
by using the computer, translating the image into a two dimensional map of the temperature of the thermochromic liquid crystal;
analyzing the image and determining whether the image is saturated;
lowering the temperature of the thermochromic liquid crystal layer if the image is saturated; and otherwise maintaining the temperature of the thermochromic liquid crystal layer at a central temperature if the image is not saturated.

14. The method of claim 13, wherein lowering the temperature includes using a heat exchanger coupled to the converter, and a thermally sealed unit enclosing the converter.

15. The method of claim 13, wherein raising the temperature includes using a heat exchanger coupled to the converter, and a thermally sealed unit enclosing the converter.

\* \* \* \* \*